(12) United States Patent
Virtej et al.

(10) Patent No.: US 9,867,074 B2
(45) Date of Patent: Jan. 9, 2018

(54) METHOD AND APPARATUS FOR HANDLING BUFFER STATUS REPORTING AND SCHEDULING REQUEST WITH DUAL CONNECTIVITY

(71) Applicant: NOKIA TECHNOLOGIES OY, Espoo (FI)

(72) Inventors: Elena Virtej, Espoo (FI); Petteri Lunden, Espoo (FI); Esa Malkamäki, Espoo (FI); Chunli Wu, Beijing (CN); Claudio Rosa, Randers (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/032,931

(22) PCT Filed: Nov. 1, 2013

(86) PCT No.: PCT/CN2013/086447
§ 371 (c)(1),
(2) Date: Apr. 28, 2016

(87) PCT Pub. No.: WO2015/062085
PCT Pub. Date: May 7, 2015

(65) Prior Publication Data
US 2016/0295442 A1 Oct. 6, 2016

(51) Int. Cl.
*H04W 72/00* (2009.01)
*H04W 24/10* (2009.01)
(Continued)

(52) U.S. Cl.
CPC ....... *H04W 24/10* (2013.01); *H04W 28/0252* (2013.01); *H04W 28/0278* (2013.01); *H04W 72/1284* (2013.01); *H04W 88/06* (2013.01)

(58) Field of Classification Search
CPC ............ H04W 24/10; H04W 28/0252; H04W 28/0278; H04W 72/1284; H04W 88/06;
(Continued)

(56) References Cited

U.S. PATENT DOCUMENTS 9,264,930 B2 * 2/2016 Damnjanovic ... H04W 72/1252
2010/0157991 A1 * 6/2010 Kim .................. H04M 3/42221
370/352
(Continued)

FOREIGN PATENT DOCUMENTS

CN WO 2011120448 A1 * 10/2011 ........... H04L 5/0096
CN 102714824 A 10/2012
(Continued)

OTHER PUBLICATIONS

International Search Report dated Jul. 28, 2014 corresponding to International Patent Application No. PCT/CN2013/086447.
(Continued)

*Primary Examiner* — Mahendra Patel
(74) *Attorney, Agent, or Firm* — Squire Patton Boggs (US) LLP

(57) ABSTRACT

A method, apparatus and computer program product are provided to receive, at a user equipment, an indication providing a cell location to which the user equipment, operating in a dual connectivity mode, should transmit a buffer status report for one or more bearers, the cell location being one of a first location, a second location, or a first location and second location and in response to being triggered, causing buffer status report to be transmitted to the location provided in the indication. In some embodiments, the bearer may be a split bearer. In some embodiments, the indication may be provided by RRC signaling, MAC signaling or physical layer signaling.

19 Claims, 5 Drawing Sheets

(51) Int. Cl.
*H04W 72/12* (2009.01)
*H04W 28/02* (2009.01)
*H04W 88/06* (2009.01)

(58) Field of Classification Search
CPC ........... H04W 72/1252; H04W 76/025; H04W 72/0486; H04W 72/1273; H04W 72/042; H04W 72/1268; H04W 52/365; H04W 52/34; H04L 2001/0097; H04L 5/0096; H04L 5/0098; H04L 5/001; H04L 5/0007; H04L 5/0094
USPC ..... 455/452.1, 456.3, 456.1, 404.2; 370/412, 370/417, 398; 715/774
See application file for complete search history.

(56) References Cited

U.S. PATENT DOCUMENTS

| | | | | |
|---|---|---|---|---|
| 2010/0272091 | A1* | 10/2010 | Fabien .................. | H04W 48/08 370/345 |
| 2010/0302946 | A1* | 12/2010 | Yang ...................... | H04B 7/155 370/235 |
| 2011/0243106 | A1* | 10/2011 | Hsu ........................ | H04L 5/0096 370/336 |
| 2013/0100839 | A1* | 4/2013 | Arora ................. | H04W 36/0016 370/252 |
| 2015/0351119 | A1* | 12/2015 | Song ................. | H04W 72/1268 370/329 |
| 2015/0358838 | A1* | 12/2015 | Wei ...................... | H04W 24/04 370/228 |
| 2016/0143039 | A1* | 5/2016 | Baldemair ........ | H04W 72/1252 370/329 |

FOREIGN PATENT DOCUMENTS

| | | | |
|---|---|---|---|
| CN | WO 2013078961 A1 * | 6/2013 | |
| CN | WO 2014015794 A1 * | 1/2014 | .......... H04W 74/006 |
| CN | WO 2015035579 A1 * | 3/2015 | |
| CN | EP 3043611 A4 * | 9/2016 | |
| DK | WO 2013113390 A1 * | 8/2013 | |
| EP | 3050382 A1 | 8/2016 | |
| KR | EP 2584715 A4 * | 9/2015 | ............ H04W 52/54 |
| SE | WO 2015047152 A1 * | 4/2015 | |
| WO | WO 2010/135995 A1 | 12/2010 | |
| WO | WO 2011/120448 A1 | 10/2011 | |
| WO | 2013078961 A1 | 6/2013 | |
| WO | 2013113390 A1 | 8/2013 | |
| WO | 2013135290 A1 | 9/2013 | |

OTHER PUBLICATIONS

Vietnamese Office Action application No. 1-2016-01900 dated Jun. 28, 2016.
Ericsson "Uplink scheduling and BSRs with dual connectivity" 3GPP TSG-RAN WG2 Meeting #83bis, R2-133412. Oct. 7-11, 2013.
Nsn et al., "MAC details for dual connectivity" 3GPP TSG-RAN WG2 Meeting #83bis, R2-133211. Oct. 7-11, 2013.
European Search Report dated May 24, 2017, issued in corresponding EP Application No. 13896697.3.
Japanese Office Action dated Jun. 26, 2017, issued in corresponding JP Application No. 2016-526203. (English Language Translation attached).

* cited by examiner

| | |
|---|---|
| receiving, at a user equipment (UE), an indication providing a cell location to which the UE, operating in a dual connectivity mode, should transmit a buffer status report (BSR) for split bearers, the cell location being one of a first location, a second location, or a first location and second location | 405 |
| in response to being triggered, causing BSR to be transmitted to the location provided in the indication | 410 |
| in an instance in which the indication provides that the UE is to transmit the BSR to the first cell location and the second cell location in an alternating manner, causing the UE to transmit a first scheduling request (SR) to the first cell location; causing the UE to wait a predetermined time after transmitting the SR; and causing the UE to transmit a second SR to the second cell location if an UL grant is not received in response to the first SR | 415 |
| in an instance in which the indication provides that the UE is to transmit the BSR to the first cell location and the second cell location in an alternating manner, causing the UE to transmit a first scheduling request (SR) to the first cell location; if an UL grant is not received in response to the first SR, causing the UE to re-transmit a first SR to the first cell location; and causing the UE to transmit a second SR to the second cell location if after a predetermined number of re-transmission, an UL grant is not received in response to the first SR | 420 |
| in an instance in which the indication provides that the UE is to transmit the BSR to the first cell location and the second cell location in an alternating manner, causing the UE to transmit a first scheduling request (SR) to the first cell location; and if an UL grant is not received in response to the first SR, causing the UE to transmit a second SR to the second cell location if an UL grant is not received in response to the first SR | 425 |

Figure 4

| receiving, at a user equipment (UE), an indication providing a cell location to which the UE, operating in a dual connectivity mode, should transmit a buffer status report (BSR) for split bearers, the cell location being one of a first location, a second location, or a first location and second location | 505 |

| in an instance in which the indication provides that the UE is to transmit the BSR to the first cell location, causing the UE to transmit a first scheduling request (SR) to the first cell location; and if Radio Link Monitoring (RLM) indicates that a signal from the first cell location is weak or if a radio link failure (RLF) condition is triggered, causing the UE to transmit the BSR and SR to the second cell location | 510 |

| in an instance in which the indication provides that the UE is to transmit the BSR to the first cell location and the second cell location, causing the BSR to include a bit indicating the BSR is being transmitted to both the first cell location and the second cell location | 515 |

520

| in an instance in which no uplink (UL) bearer split is configured, a Physical uplink shared channel (PUSCH) is being utilized to only to one cell location, and RLC status forwarded over Xn to a second cell location, and wherein transmitting BSR to the first cell location fails, causing BSR to be transmitted to the second cell location |

525

| in an instance in which no uplink (UL) bearer split is configured, a Physical uplink shared channel (PUSCH) is being utilized to only to one cell location, and RLC status forwarded over Xn to a second cell location, and wherein transmitting BSR to the first cell location fails, causing BSR to be transmitted to the second cell location; and causing an attempt at random access to the first cell location |

| including with the BSR transmitted to the second cell location, signaling indicating that the first cell location failed to provide a response | 530 |

| in an instance in which UL transmission to the first cell location, and RLC status PDUs related to DL data are being sent to the second cell location, causing transmission of the BSR, the BSR only indicating an amount of data relevant to the receiving cell | 535 |

Figure 5

METHOD AND APPARATUS FOR HANDLING BUFFER STATUS REPORTING AND SCHEDULING REQUEST WITH DUAL CONNECTIVITY

TECHNOLOGICAL FILED

An example embodiment of the present invention relates generally to the handling of a buffer status report (BSR) and a scheduling report (SR) and, more particularly, to handling of a buffer status report (BSR) and a scheduling report (SR) where a user equipment (UE) is configured for or operating with dual connectivity.

BACKGROUND

Long term evolution ("LTE") of the Third Generation Partnership Project ("3GPP"), also referred to as 3GPP LTE, refers to research and development as part of an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/medium access control/physical layers) and control plane (including radio resource control/packet data convergence protocol/radio link control/medium access control/physical layers) protocol terminations towards wireless communication devices such as cellular telephones. A wireless communication device or terminal is generally known as user equipment ("UE"). A base station ("BS") is an entity or network element of a communication system or network often referred to as a Node B or an NB. Particularly in the E-UTRAN, an "evolved" base station is referred to as an eNodeB or an "eNB".

BRIEF OVERVIEW

A current topic under discussion in the wireless industry relates to enhanced support of small cell deployment and operation, which may include, for example, the identification and evaluation of the benefits of UEs having dual connectivity to, for example, macro and small cell layers served by different carriers or, in some instances, the same carrier, and furthermore, for which scenarios dual connectivity may be feasible and/or beneficial. Additionally, another topic may include the identification and evaluation of potential architecture and protocol enhancements for scenarios involving UEs configured for dual connectivity in order to minimize core network impacts.

For example, in a recent agreement, two main user plane (UP) architectures were considered as way forward in case of dual connectivity, (e.g., a first architecture not having a split bearer, such as "1A" and a second architecture having a split bearer, such as "3C", each of which will be discussed later). In some embodiments, different architecture alternatives and/or different configuration options may be utilized, any combination of which may be used simultaneously (for different bearers). However, unresolved problems may include, for example, with dual connectivity, a UE may be connected to two eNBs simultaneously (e.g., a master eNB (MeNB) and a secondary eNB (SeNB), each of which will be described later). Having a UE connected to two eNBs simultaneously may result in a situation where it is unclear, in some cases, as to which eNB the UE should transmit a buffer status report (BSR) and/or a scheduling request (SR). In some embodiments, how the network (NW) handles uplink (UL) scheduling of the UE may also be unresolved. Some embodiments may utilize other UP architectures for dual connectivity as well, both for bearer split and no bearer split.

TS36.321 of the 3GPP specification specifies traditional BSR and SR procedure, but such procedures may not be at least in some parts be applicable to dual connectivity cases, such as where UEs may be connected to two eNBs simultaneously.

BRIEF SUMMARY

A method, apparatus and computer program product are provided in accordance with an example embodiment for providing an indication of a cell location, (e.g., a particular base station, node, or a eNB), to which the UE, operating in a dual connectivity mode, should transmit a buffer status report (BSR) for split bearers, the cell location being one of a first location, a second location, or a first location and second location. In some embodiments, instead of cell location, the indication may be provided for a (radio) link, MAC entity, logical channel, cell group, cell, etc. where each of these may be tied to the master and/or secondary eNB or one of the cell provided by MeNB or SeNB.

In some embodiments, a method may be provided comprising receiving, at a user equipment, an indication providing a cell location to which the user equipment, operating in a dual connectivity mode, should transmit a buffer status report for each of at least one bearer, the cell location being one of a first location, a second location, a first location and second location, or a first location or second location, and in response to being triggered, causing buffer status report to be transmitted to the location provided in the indication. In some embodiments, the bearer is a split bearer.

In some embodiments, the method may further comprise, in an instance in which the indication provides that the user equipment is to transmit the buffer status report to the first cell location and the second cell location in an alternating manner, causing the user equipment to transmit a first scheduling request to the first cell location, causing the user equipment to wait a predetermined time after transmitting the scheduling request, and causing the user equipment to transmit a second scheduling request to the second cell location if an uplink grant is not received in response to the first scheduling request. In some embodiments, the indication is provided by radio resource control signaling, media access control signaling or physical layer signaling.

In some embodiments, the method may further comprise, in an instance in which the indication provides that the user equipment is to transmit the buffer status report to the first cell location and the second cell location in an alternating manner, causing the user equipment to transmit a first scheduling request to the first cell location, if an uplink grant is not received in response to the first scheduling request, causing the user equipment to re-transmit a first scheduling request to the first cell location, and causing the user equipment to transmit a second scheduling request to the second cell location if after a predetermined number of re-transmission or predetermined time, an uplink grant is not received in response to the first scheduling request.

In some embodiments, the method may further comprise, in an instance in which the indication provides that the user equipment is to transmit the buffer status report to the first cell location and the second cell location in an alternating manner, causing the user equipment to transmit a first scheduling request to the first cell location, and if an uplink grant is not received in response to the first scheduling request, causing the user equipment to transmit a second scheduling request to the second cell location.

In some embodiments, the method may further comprise, in an instance in which the indication provides that the user equipment is to transmit the buffer status report to the first cell location, causing the user equipment to transmit a first scheduling request to the first cell location, and if radio link monitoring indicates that a signal from the first cell location is weak or if a radio link failure condition is triggered, causing the user equipment to transmit the buffer status report and scheduling request to the second cell location.

In some embodiments, the method may further comprise, in an instance in which the indication provides that the user equipment is to transmit the buffer status report to the first cell location and the second cell location, causing the buffer status report to include a bit indicating the buffer status report is being transmitted to both the first cell location and the second cell location.

In some embodiments, the method may further comprise, wherein transmitting buffer status report to the first cell location fails, causing buffer status report to be transmitted to the second cell location. In some embodiments, the method may further comprise, including with the buffer status report transmitted to the second cell location, signaling indicating that the first cell location failed to provide a response. In some embodiments, the method may further comprise, in an instance in which uplink transmission to the first cell location, and radio link control status protocol data units related to downlink data are being sent to the second cell location, causing transmission of the buffer status report, the buffer status report only indicating an amount of data relevant to the receiving cell.

In some embodiments an apparatus may be provided. The apparatus comprising at least one processor and at least one memory including computer program code, the at least one memory and computer program code configured to, with the processor, cause the apparatus to receive an indication providing a cell location to which the apparatus, operating in a dual connectivity mode, should transmit a buffer status report for each of at least one bearer, the cell location being one of a first location, a second location, a first location and second location, or a first location or second location, and in response to being triggered, causing buffer status report to be transmitted to the location provided in the indication. In some embodiments the bearer is a split bearer. In some embodiments the indication is provided by radio resource control signaling, media access control signaling or physical layer signaling.

In some embodiments the at least one memory and computer program code are further configured to, with the processor, cause the apparatus to in an instance in which the indication provides that the user equipment is to transmit the buffer status report to the first cell location and the second cell location in an alternating manner, causing the user equipment to transmit a first scheduling request to the first cell location, causing the user equipment to wait a predetermined time after transmitting the scheduling request, and causing the user equipment to transmit a second SR to the second cell location if an uplink grant is not received in response to the first scheduling request.

In some embodiments the at least one memory and computer program code are further configured to, with the processor, cause the apparatus to in an instance in which the indication provides that the user equipment is to transmit the buffer status report to the first cell location and the second cell location in an alternating manner, causing the user equipment to transmit a first scheduling request to the first cell location, if an uplink grant is not received in response to the first scheduling request, causing the user equipment to re-transmit a first scheduling request to the first cell location, and causing the user equipment to transmit a second scheduling request to the second cell location if after a predetermined number of re-transmission, an uplink grant is not received in response to the first scheduling request.

In some embodiments the at least one memory and computer program code are further configured to, with the processor, cause the apparatus to in an instance in which the indication provides that the user equipment is to transmit the buffer status report to the first cell location and the second cell location in an alternating manner, causing the user equipment to transmit a first scheduling request to the first cell location, if an uplink grant is not received in response to the first scheduling request, causing the user equipment to transmit a second scheduling request to the second cell location if after a predetermined number of re-transmission.

In some embodiments the at least one memory and computer program code are further configured to, with the processor, cause the apparatus to in an instance in which the indication provides that the UE is to transmit the BSR to the first cell location and the second cell location in an alternating manner, causing the UE to transmit a first scheduling request (SR) to the first cell location, and if an UL grant is not received in response to the first SR, causing the UE to transmit a second SR to the second cell location if after a predetermined number of re-transmission, an UL grant is not received in response to the first SR.

In some embodiments in an instance in which the indication provides that the user equipment is to transmit the buffer status report to the first cell location, causing the user equipment to transmit a first scheduling request to the first cell location, and if radio link monitoring indicates that a signal from the first cell location is weak or if a radio link failure condition is triggered, causing the user equipment to transmit the buffer status report and scheduling request to the second cell location.

In some embodiments, a computer program product may be provided comprising a non-transitory computer readable medium having program code portions stored thereon, the program code portions configured, upon execution to receive an indication providing a cell location to which the user equipment, operating in a dual connectivity mode, should transmit a buffer status report for each of at least one, the cell location being one of a first location, a second location, a first location and second location, or a first location or second location, and in response to being triggered, causing buffer status report to be transmitted to the location provided in the indication. In some embodiments the bearer is a split bearer. In some embodiments the indication is provided by radio resource control signaling, media access control signaling or physical layer signaling.

In some embodiments the program code portions are further configured, upon execution, to in an instance in which the indication provides that the user equipment is to transmit the buffer status report to the first cell location and the second cell location in an alternating manner, causing the user equipment to transmit a first scheduling request to the first cell location, causing the user equipment to wait a predetermined time after transmitting the scheduling request, and causing the user equipment to transmit a second scheduling request to the second cell location if an uplink grant is not received in response to the first scheduling request.

In some embodiments the program code portions are further configured, upon execution, to in an instance in which the indication provides that the user equipment is to transmit the buffer status report to the first cell location and the second cell location in an alternating manner, causing the user equipment to transmit a first scheduling request to the first cell location, if an uplink grant is not received in response to the first scheduling request, causing the user equipment to re-transmit a first scheduling request to the first cell location, and causing the user equipment to transmit a second scheduling request to the second cell location if after a predetermined number of re-transmission, an uplink grant is not received in response to the first scheduling request.

In some embodiments the program code portions are further configured, upon execution, to in an instance in which the indication provides that the user equipment is to transmit the buffer status report to the first cell location and the second cell location in an alternating manner, causing the user equipment to transmit a first scheduling request to the first cell location, and causing the user equipment to transmit a second scheduling request to the second cell location if after a predetermined number of re-transmissions, an uplink grant is not received in response to the first scheduling request.

In some embodiments the program code portions are further configured, upon execution, to in an instance in which the indication provides that the user equipment is to transmit the buffer status report to the first cell location, causing the user equipment to transmit a first scheduling request to the first cell location, and if radio link monitoring indicates that a signal from the first cell location is weak or if a radio link failure condition is triggered, causing the user equipment to transmit the buffer status report and scheduling request to the second cell location.

BRIEF DESCRIPTION OF THE SEVERAL VIEWS OF THE DRAWINGS

Figure 1:
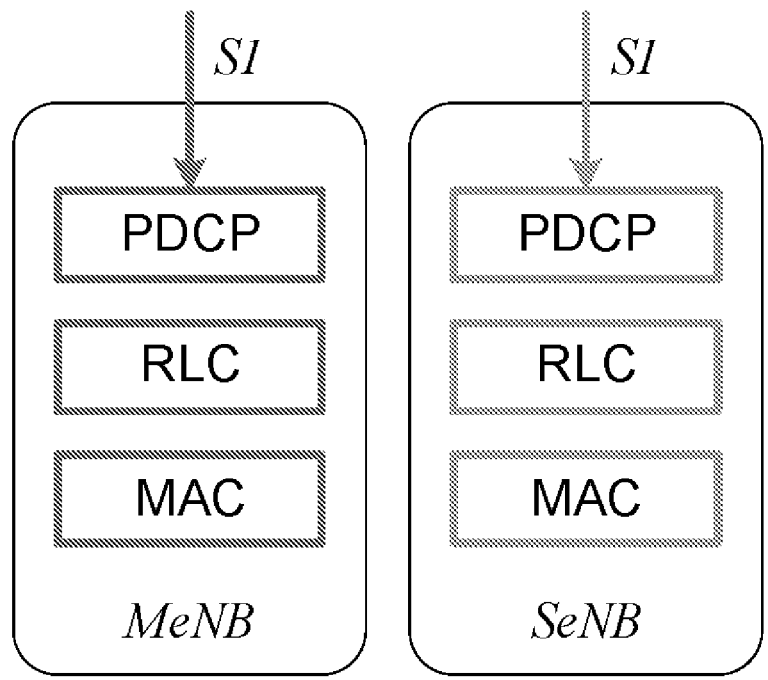
Figure 2:
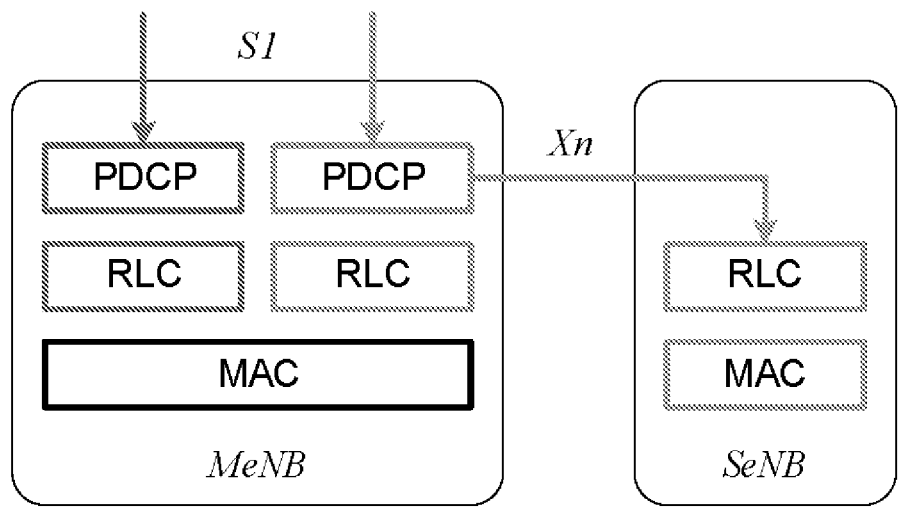
Figure 3C:
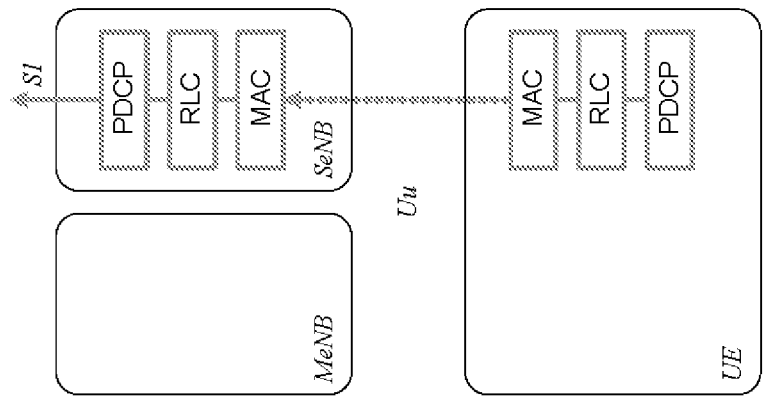
Figure 3B:
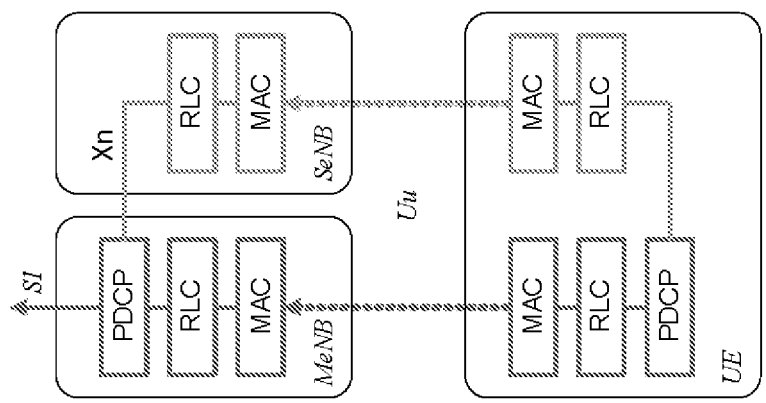
Figure 3A:
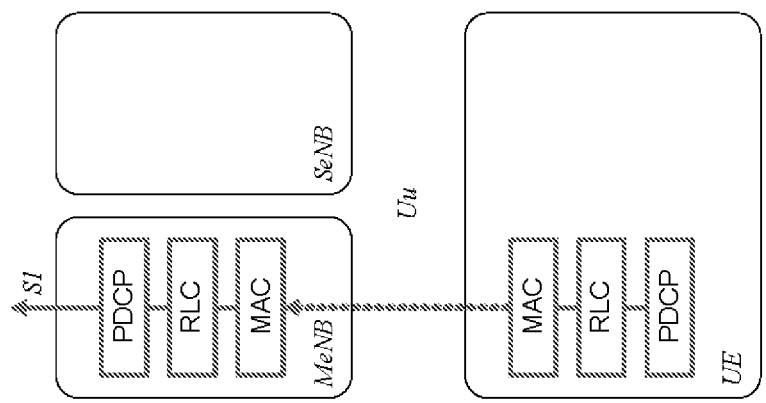

Having thus described example embodiments of the invention in general terms, reference will now be made to the accompanying drawings, which are not necessarily drawn to scale, and wherein:

FIG. 1 is a schematic representation of type of no bearer split (eNB specific bearers) type architecture in accordance with an example embodiment of the present invention;

FIG. 2 a schematic representation of type of bearer split type architecture in accordance with an example embodiment of the present invention;

FIGS. 3A-3C are block diagrams of an apparatus and base station system that may be specifically configured for in accordance with an example embodiment of the present invention; and FIG. 4 is a flow chart illustrating the operations performed, such as by the apparatus of FIG. 3, in accordance with an example embodiment of the present invention.

Figure 6:
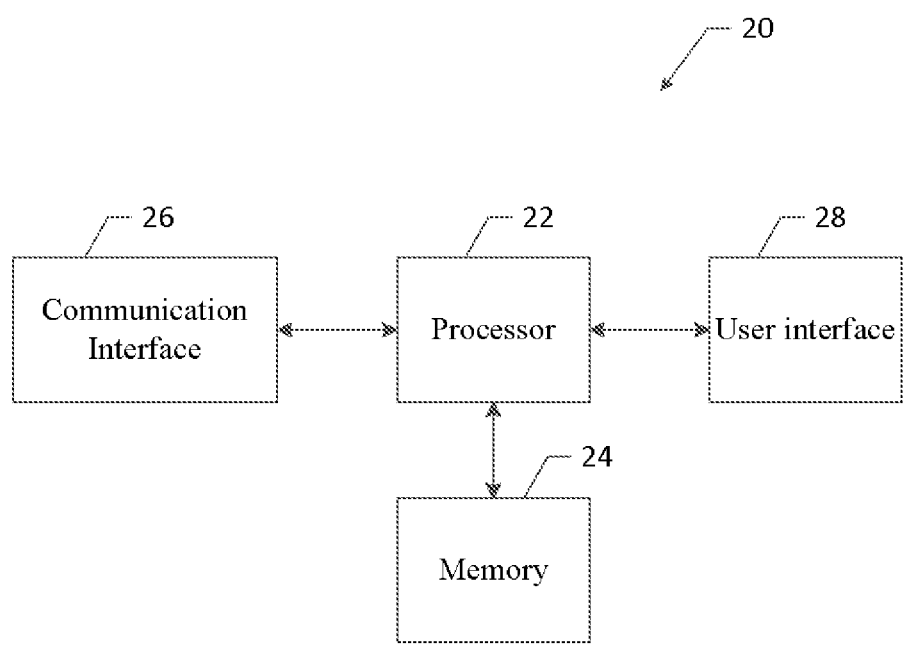

FIG. 5 is a flow chart illustrating the operations performed, such as by the apparatus of FIG. 3, in accordance with an example embodiment of the present invention; and FIG. 6 is a block diagram of an apparatus that may be specifically configured for in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Example embodiments of the present invention will now be de-scribed more fully hereinafter with reference to the accompanying drawings, in which some, but not all embodiments of the invention are shown, indeed, the invention may be embodied in many different forms and should not be construed as limited to the embodiments set forth herein: rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments Like reference numerals refer to like elements throughout.

The present invention is applicable to any user terminal, server, application server, corresponding component, and/or to any communication system or any combination of different communication systems. The communication system may be a fixed communication system or a wireless communication system or a communication system utilizing both fixed networks and wireless networks. The protocols used the specifications of communication systems, transmitters, user terminals, base stations and access points, especially in wireless communication, develop rapidly. Such development may require extra changes to an embodiment.

Therefore, all words and expressions should be interpreted broadly and they are intended to illustrate, not to restrict, the embodiment.

Embodiments of the present invention may be implemented in various devices and systems, where radio signals may be used to carry data between devices such as handheld and infrastructure communications devices. Examples of the devices comprise user equipment (UE), a mobile phone, a base station (BS), a Node-B (NB), an enhanced NB (eNB), a relay station and a server, for example. For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. Furthermore, small cell base station may have limited (or non-ideal) backhaul connection that may have higher latency or lower throughput than macro cell base stations. This limited backhaul connection may affect communication between small cell base station and other base stations and other network elements or nodes. A user equipment may act as an access point or a base station for other devices (multiple devices, or part of device to device communication or group communication), so that in some cases also a user equipment could be considered also a limited capability base station or small cell. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. The small cell base station may be implemented as a secondary base station, for example, a secondary cell (SCell) eNB in carrier aggregation. It may also be called a secondary eNB (SeNB). Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macro cell served by a typical base station, such as for example the eNB base station. The macro cell base station may be also implemented as a primary base station, for example, a primary cell (PCell) eNB in carrier aggregation and may also be called master eNB (MeNB). The base stations may also be configured to provide other types of air interfaces, such as various first generation (1G) communication protocols, second generation (2G or 2.5G) communication protocols, third-generation (3G) communication protocols, fourth-generation (4G) communication protocols, WiFi (or other small cell protocols), and/or any other wireless access network communication protocols. Although certain standards and technologies are described, these are merely examples as other standards and technologies may be used as well.

There may be also more than one serving cell associated with MeNB and/or SeNB. These may be called MCG (Master Cell Group) and SCG (Secondary Cell Group) referring to group of serving cells associated with MeNB and SeNB respectively.

The base stations may also be configured to provide other types of air interfaces, such as various first generation (1G) communication protocols, second generation (2G or 2.5G) communication protocols, third-generation (3G) communication protocols, fourth-generation (4G) communication protocols, WiFi (or other small cell protocols), and/or any other wireless access network communication protocols. Although certain standards and technologies are described, these are merely examples as other standards and technologies may be used as well.

User equipment (UE) may refer to any user communication device. A term "user equipment" as used herein may refer to any device having a communication capability, such as a wireless mobile terminal, a Personal Data Assistant (PDA), a smart phone, a personal computer (PC), a laptop computer, a desktop computer, etc. For example, the wireless communication terminal may be a TErrestrial Trunked RAdio (TETRA), an Universal Mobile Telecommunications System (UMTS), an LTE, LTE-A or Global System for Mobile Communications/Enhanced Data Rates for GSM Evolution (GSM/EDGE) smart mobile terminal.

High Level Overview and Definitions

A method, apparatus and computer program product are provided in accordance with an example embodiment for providing a network configuration or indication providing a cell location to which the UE, operating in a dual connectivity mode, should transmit a buffer status report (BSR) for split bearers.

The method, apparatus and computer program product provided herein may be based on an assumption (the assumption based on a recent 3GPP RAN2 meeting), that there are at least two user plane (UP) architectures, a first architecture and a second architecture, being considered for instances of dual connectivity. The first architecture may be "1A", a type of no bearer split architecture and the second architecture may be "3C", a type of bearer split architecture, which are shown in FIGS. 1 and 2 respectively.

When discussing bearers herein, generally a "bearer" is a virtual connection between two endpoints, (e.g., UE and eNB). In some embodiments, a connection-oriented transmission network may require the establishment of a "virtual" connection between two endpoints (e.g., a UE and eNB) before any traffic may be sent between them. This virtual connection may be called an "EPS Bearer." The BSR is a medium access control (MAC) control element (CE) from the UE to the network, or eNB, carrying the information on how much data is in UE buffer to be sent out. A "cell location" as used herein is used to describe a particular base station, node, eNB, MeNB, SeNB or the like. A cell location may not include any indication of a physical address or the like. Any indication identifying a specific or particular BS, NB, eNB, a relay station a server, MeNB, SeNB or the like may satisfy "cell location."

Returning to architecture 1A, in a case of dual connectivity, the bearer is not split. In other words, one EPS bearer is routed via one eNB, typically "MeNB" or "SeNB". Therefore, in such an instance, (e.g., architecture 1A and thus, no bearer split), a UE knows which bearer goes where. However, in case of 3C architecture (e.g., bearer split), the options may not be obvious.

"Bearer splitting", as used herein, may describe that an EPS bearer may be routed via more than one eNB, which may typically be MeNB and SeNB in dual connectivity. Similarly, Long Term Evolution (LTE) carrier aggregation (CA), which is part of the LTE-Advanced standard, 3GPP Release 10, may be configured such that one bearer may be scheduled via multiple cells. However, in LTE CA, the two or more cells may be served by the same eNB, whereas in dual connectivity at least some of the cells are served by a different eNB. FIG. 2, which will be discussed later, shows an EPS bearer routed via more than one eNB, typically MeNB and SeNB in dual connectivity.

The method, apparatus and computer program product provided herein may therefore, be utilized to provide an indication of a location (e.g., to which eNB, such as MeNB or SeNB) a BSR and/or SR may be transmitted to in case of dual connectivity (or in case of a split bearer) and in which circumstances. The method, apparatus and computer program product provided herein may particularly be shown in relation to the above mentioned architectures or more generally, in an instance of 'bearer split' and/or 'non-bearer' split. Further, the method, apparatus and computer program product provided herein may provide for handling radio link control (RLC) status packet data unit (PDU), and, in some embodiments, specifically related to dual connectivity.

Traditional methods may provide for SR and BSR triggers and reporting that may be maintained per scheduler. However, traditional methods do not provide a method, apparatus and computer program product for triggering BSR/SR based on different type of bearers and in accordance with UP architectures, e.g. split bearer and no split bearer.

As such, a method, apparatus and computer program product are provided in accordance with an example embodiment in order to facilitate a network configuration that indicates where a UE should send the BSR for split bearers. In some embodiments, once the BSR is triggered toward a cell, the SR would be sent to the corresponding cell. Furthermore, in some embodiments, a UE may be indicated toward which cell it should send RLC status report (for DL traffic). In some embodiments, it should be configurable how the data available for transmission in PDCP layer for bearers served by both M-eNB and SeNB is calculated M-BSR and/or S-BSR, for each of (1) in the M-BSR only; (2) in the S-BSR only; or (3) in both M-BSR and S-BSR.

Other embodiments here may include introduction of "M-BSR" as the BSR report to MeNB and "S-BSR" as the BSR report to SeNB and the introduction of "M-SR" as the SR to MeNB and "S-SR" as the SR to SeNB.

In some embodiments, M-BSR may comprise at least data available for transmission in RLC and PDCP layer for the bearers served by MeNB only, RLC SDU segment that has not been included in a RLC data PDU, RLC retransmission PDU/portion (data) and RLC status PDU for the RLC entity corresponding to the MeNB for the bearers served by both MeNB and SeNB (or simply the data in RLC layer in the RLC entity corresponding to the MeNB for the bearers served by both MeNB and SeNB), and/or based on the configuration optionally the data in PDCP layer for the bearers served by both MeNB and SeNB.

In some embodiments, S-BSR may comprise at least data available for transmission in RLC and PDCP layer for the bearers served by SeNB only, RLC SDU segment that has not been included in a RLC data PDU, RLC retransmission PDU/portion (data) and RLC status PDU for the RLC entity corresponding to the SeNB for the bearers served by both MeNB and SeNB, and/or based on the configuration optionally the data in PDCP layer for the bearers served by both MeNB and SeNB.

In some embodiments, for higher priority data arrival BSR trigger event, the data should be restricted to the data considered to be available for transmission for each node to trigger M-BSR and S-BSR respectively. In some embodiments, padding BSR is applicable to M-BSR and S-BSR separately. In some embodiments, retxBSR-Timer and periodicBSR-Timer may be configured and maintained separately for M-BSR and S-BSR.

In some embodiments, regular M-BSR triggers SR to MeNB (M-SR) if no UL grant for new transmission for MeNB when the BSR is triggered and regular S-BSR triggers SR to SeNB (S-SR) if no UL grant for new transmission for SeNB when the S-BSR is triggered.

One advantage of the present application is providing support for handling BSR/SR for split bearers with dual connectivity.

Example Architecture

FIG. 1 shows a first user plane (UP) architecture, the first UP architecture comprising no bearer split architecture (e.g., architecture 1A). In case of architecture 1A, or, in some embodiments, any UP architecture comprising no bearer split, a UE may know which bearer goes where. For example, in case of a first architecture (e.g., architecture 1A) and in case of dual connectivity, the bearer is not split, and one EPS bearer is routed via one eNB, typically MeNB or SeNB.

However, FIG. 2 shows a second UP architecture (e.g., 3C architecture). The second UP architecture comprises an example of bearer split. In some embodiments, the second UP architecture or any UP architecture comprising bearer split, the options to where UE transmits BSR may not be obvious (e.g., a UE may not know which bearer goes where).

Bearer splitting, as used herein, means that an EPS bearer may be routed via more than one eNB, which may typically be MeNB and SeNB in dual connectivity. As described above, this is similar to Rel 10/11 carrier aggregation where one bearer may be scheduled via multiple cells. In carrier aggregation, the two or more cells are served by the same eNB whereas in dual connectivity at least some of the cells are served by another eNB. This is illustrated in FIG. 2, which shows architecture of bearer split 3C.

Example Network Configuration

In some embodiments, a network configuration may be provided to address one or more issues that may arise through the use of the previously described architecture. For example, in some embodiments, a network configuration may be provided to address a location and/or a method for UE transmission of BSR and SR in case of dual connectivity, particularly in the above mentioned architectures (or in case of 'bearer split' and 'non-bearer' split). Additionally, some embodiments of the present application address how a radio link control (RLC) status protocol data unit (PDU) is handled and in some embodiments, how RCL status PDU is sent with regard to dual connectivity.

As an initial matter, with dual connectivity using for example, UP architecture 1A and/or 3C, three types of bearers may each require or be configured for different BSR/SR procedures: (1) MeNB specific bearer; (2) SeNB specific bearer; and (3) split bearers. FIGS. 3A, 3B and 3C show the dual connectivity options. Specifically, FIG. 3A shows a MeNB specific bearer, FIG. 3C shows a SeNB specific bearer; and FIG. 3B shows split bearers.

More specifically, FIG. 3A shows a first type of bearer (e.g., served only by MeNB, one RLC entity only to MeNB). FIG. 3B shows a second type of bearer (e.g., served by both MeNB and SeNB, two RLC entities to both MeNB and SeNB). FIG. 3C shows a third type of bearer (e.g., served only by SeNB, one RLC entity only to SeNB).

The MeNB specific bearer may be/behave like a legacy bearer and may use legacy procedure. In some embodiments, the SeNB specific bearer may also be a legacy bearer and use legacy procedure. However, in an instance in which transmitting BSR to SeNB fails (e.g., no response to SR, or transmitting BSR fails), UE could, in addition to (or instead of) attempting random access to SeNB, indicate to MeNB that SeNB did not respond. UE may also send the BSR to MeNB in this case.

Regarding a split bearer, three different BSR/SR alternatives may be configured: (1) No UL bearer split; (2) UL data going to only one eNB, but still sending RLC status PDUs related to DL data in the other eNB; and (3) UL bearer split.

In the first alternative, specifically, a configuration in which there is no UL bearer split. For example, a physical uplink shared channel (PUSCH) may be configured to transmit to only to one cell and RLC status forwarded over $X_n$ as shown in FIG. 3B. Here, similar to a legacy case, but in an instance in which transmitting BSR to SeNB fails, UE may, in addition to, (or instead of) attempting random access to SeNB, be configured to attempt to transmit the BSR to the MeNB as well. In some embodiments, the UE may further be configured to indicate that SeNB failed to respond.

In the second alternative, specifically in an instance in which UL data is being transmitted to a single eNB, the UE may still be transmitting RLC status PDUs related to DL data in the other eNB. Here, BSR may indicate only the amount of data relevant to the receiving cell: I.e. RLC status PDUs, or RLC status PDUs+user data.

In the third alternative, which includes UL bearer split, a NW and or UE may be configured such that a UE transmits BSR to one of (1) MeNB; (2) SeNB; (3) both; or (4) alternating to MeNB and SeNB (or vice versa order) until UE is given UL grant. In some embodiments, BSR may include information whether the UE has sent (or is attempting to send) the BSR to the other eNB as well. In some embodiments, a master BSR and a secondary BSR may be configured for such configuration.

In some embodiments, still regarding the third alternative, UE may be configured with a threshold for buffered UL data. The threshold may be per bearer or Logical Channel Group (LCG) such that when amount of data is below the threshold, UE may send BSR just to a single eNB (e.g. SeNB). In some embodiments, UE may also send BSR to the other eNB only when exceeding the threshold. Such a configuration may be configured such that if UE has only a small amount (less than a predetermined threshold) of data to be scheduled (e.g., Transmission Control Protocol (TCP) acknowledgements) there is no need for two ULs. UE may also be configured with a delay threshold or UL throughput threshold determining when the UE should send BSR to a second eNB in addition to the primary option.

In some embodiments, still regarding the third alternative, in an instance in which the NW configures UE to send BSR to both a first eNB and a second eNB (e.g., MeNB and SeNB), data until a certain threshold may be reported to, for example, SeNB and after the threshold is met or exceeded, to MeNB. In some embodiments, data until a certain threshold may be reported to, for example, SeNB and after the threshold, data may be reported to both, in some proportion, in full or in some embodiments, with some weighting.

In order to achieve the previously described configurations, two types of BSR reports may be defined: "M-BSR" and "S-BSR" which are the BSRs transmitted to MeNB and SeNB, respectively. M-BSR may comprise buffer status for legacy bearers and split bearers and S-BSR may comprise buffer status for bearer configured for SeNB and split bearers.

In some embodiments, M-BSR may be triggered by legacy (MeNB) new data and S-BSR may be triggered by new data for bearers configured for SeNB. For split bearers either M-BSR or S-BSR or both may be triggered. For split bearers (and also for non-split bearers), in order to keep the network control for UL scheduling, when configuring the bearer, NW may also configure to which cell location, e.g., eNB, the BSR may be sent. At least, three alternatives are possible: (1) To MeNB only, where for example, only M-BSR may be triggered; (2) To SeNB only, where for example, only S-BSR may be triggered; and (3) To both MeNB and SeNB, where for example, both M-BSR and S-BSR may be triggered.

Hence M-BSR may comprise (1) data available for transmission in a RLC and a PDCP layer for the bearers served by MeNB only, (2) RLC retransmission data and RLC status PDU for the RLC entity corresponding to the MeNB for the bearers served by both MeNB and SeNB, if any (or all the data available for transmission in RLC entity of MeNB if possible to deliver new data from PDCP to RLC before the UE receives an UL grant for offline processing); and (3) based on the configuration, optionally, the data in PDCP layer for the bearers served by both MeNB and SeNB.

S-BSR may comprise (1) data available for transmission in a RLC and a PDCP layer for the bearers served by SeNB only; (2) RLC retransmission data and RLC status PDU for the RLC entity corresponding to the SeNB for the bearers served by both MeNB and SeNB, if any (or all the data available for transmission in RLC entity of SeNB if possible to deliver new data from PDCP to RLC before the UE gets UL grant for offline processing); and (3) based on the configuration, optionally, the data in PDCP layer for the bearers served by both MeNB and SeNB.

In some embodiments, where higher priority data arrival is the BSR trigger event, it should be restricted the data considered to be available for transmission for each node to trigger M-BSR and S-BSR respectively. For example, the data should be restricted to the data considered to be available for transmission for each node as proposed M-BSR and S-BSR content to trigger M-BSR and S-BSR respectively.

In some embodiments, such as those related to the third alternative, further configuration may be included. For example, the BSR may be transmitted to only one eNB if the amount of data is below a threshold (e.g., TCP ACK), the NW to configure to which eNB. With these arrangements, NW may detect for split bearers whether BSR has been sent to one or both eNBs. In some embodiments, NW may control UL scheduling at least semi-statically, such as for example, depending on the Xn delays, eNBs may have more or less cooperation dynamically and also share BSR over Xn. With such arrangements sending full BSR info to both eNBs in the third alternative may allow for NW to know that both eNBs may schedule in that case.

In some embodiments, the SR may then be sent to the same eNB where BSR is intended. For UL data transmission of the split bearers, possible to have UL data transmission linked in the same ways as BSR or allow data of the bearer to be transmitted to any eNB even if BSR of the bearer is configured to one of the eNBs, or it can be separately configured as UL data transmission may impact the PDCP layer in eNB side.

Example Processes

Referring now to FIGS. 4 and 5, the operations performed, such as by the apparatus 20 of FIG. 6, which will be described later, in order to introduce a network configuration that provides an indication to where UE should send the BSR for split bearers are illustrated.

In some embodiments, UE may be provided with an indication where UE may send the BSR/SR. In case of bearer split, for example, UE may receive an indication to transmit to (1) MeNB, (2) SeNB or (3) both (immediately, or in alternating manner). FIG. 4 shows an example method where a NW configures UE for providing BSR and consequently, in some embodiments, SR, to each of a first cell location (e.g., MeNB) and a second cell location (e.g., SeNB) in an alternating manner. In some embodiments, depending on which of these configurations is provided, particular rules may also be provided. In general, when NW configures a split bearer, the NW may then provide an indication to the UE comprising information to which cell it should send BSR related to this bearer.

FIG. 4 shows an example method where a NW configures UE for providing BSR and consequently, in some embodiments, SR, to each of a first cell location (e.g., MeNB) and a second cell location (e.g., SeNB) in an alternating manner.

As shown in block 405 of FIG. 4, the apparatus may include means, such as the processor 22 or the like, for receiving, at a user equipment (UE), an indication providing a cell location to which the UE, operating in a dual connectivity mode, may transmit a buffer status report (BSR) for one or more bearers, the cell location being one of a first location, a second location, or a first location and second location. In some embodiments, the one or more bearers may be a split bearer. In some embodiments, the indication may be provided by radio resource control (RRC) signaling (configuration), media access control (MAC) signaling (MAC CE) or physical layer signaling.

As shown in block 410 of FIG. 4, the apparatus 20 may include means, such as a processor 22 or the like, for, in response to being triggered, causing BSR to be transmitted to the location provided in the indication.

In some embodiments, if the UE is configured to send the BSR in both eNBs in alternating manner, then if UE does not get the UL grant (after sending SR), UE shall try the other cell. For example, after a certain configured/predetermined time, or with first N (e.g. 1, 2) SR attempts to one cell (sending SR+waiting duration of prohibit timer or some other predefined time period). In some embodiments, when there are SR re-transmissions, UE may be configured to transmit to the other cell as well. For example, after 1, 2 or so transmission attempts. This may be necessary especially if there is no (radio link failure) RLF or such deactivation condition for SeNB. Furthermore, there may be a condition based on radio link monitoring that prevents UE transmitting anything towards SeNB in the uplink e.g. after the link quality has become very low. In this case UE may not be allowed to transmit in uplink to SeNB and thus it may be configured to instead transmit BSR (e.g. in case of split bearer) and SR to the MeNB. Similarly, even for non-split bearers if uplink transmissions are not anymore allowed or are not successful towards SeNB, UE could send also the buffer status of SeNB specific bearers to MeNB to indicate to MeNB that e.g., bearer switching should be done.

As such, as shown in block 415 of FIG. 4, the apparatus 20 may include means, such as a processor 22 or the like, for, in an instance in which the indication provides that the UE is to transmit the BSR to the first cell location and the second cell location in an alternating manner, causing the UE to transmit a first scheduling request (SR) to the first cell location, causing the UE to wait a predetermined time after transmitting the SR, and causing the UE to transmit a second SR to the second cell location if an UL grant is not received in response to the first SR.

Here for example, UE, having been provided an indication to transmit the BSR to the first cell location (e.g., MeNB) and the second cell location (e.g., SeNB) in an alternating manner, may, for example, after a certain configured/predetermined time, transmit to the second cell location (e.g., SeNB), if, for example, an UL grant has not been received in response to the first SR.

As shown in block 420 of FIG. 4, the apparatus 20 may include means, such as a processor 22 or the like, for in an instance in which the indication provides that the UE is to transmit the BSR to the first cell location and the second cell location in an alternating manner, causing the UE to transmit a first scheduling request (SR) to the first cell location, if an UL grant is not received in response to the first SR, causing the UE to re-transmit a first SR to the first cell location, and causing the UE to transmit a second SR to the second cell location if after a predetermined number of re-transmission, an UL grant is not received in response to the first SR.

Here, for example, UE, having been provided an indication to transmit the BSR to the first cell location (e.g., MeNB) and the second cell location (e.g., SeNB) in an alternating manner, may, for example, after a certain configured or predetermined number of attempts, transmit to the second cell location (e.g., SeNB), if, for example, an UL grant has not been received in response to a predetermined number of re-transmissions. For example, after 1, 2 or any other predetermined number of transmission attempts are made, transmission is then made to the other eNB. This may be necessary especially if there is no RLF or such deactivation condition for SeNB.

As shown in block 425 of FIG. 4, the apparatus 20 may include means, such as a processor 22 or the like, in an instance in which the indication provides that the UE is to transmit the BSR to the first cell location and the second cell location in an alternating manner, causing the UE to transmit a first scheduling request (SR) to the first cell location; and if an UL grant is not received in response to the first SR, causing the UE to transmit a second SR to the second cell location if an UL grant is not received in response to the first SR.

In some embodiments, when alternating SR to MeNB and SeNB, UE may have only one SR active at a time. In other words, if the second SR is sent, UE may be configured to cancel the first SR (if these are triggered for the same bearer/BSR). In some embodiments, when sending second SR, UE may assume that first SR is no longer "active" as there has been enough time for NW to schedule the UE.

FIG. 5 shows an example method where a NW configures UE for providing BSR and consequently, in some embodiments, SR, to each a first cell location (e.g., MeNB) and/or a second cell location (e.g., SeNB).

As shown in block 505 of FIG. 5, the apparatus may include means, such as the processor 22 or the like, for receiving, at a user equipment (UE), an indication providing a cell location to which the UE, operating in a dual connectivity mode, should transmit a buffer status report (BSR) for split bearers, the cell location being one of a first location, a second location, or a first location and second location.

As shown in block 510 of FIG. 5, the apparatus may include means, such as the processor 22 or the like, for in an instance in which the indication provides that the UE is to transmit the BSR to the first cell location, causing the UE to transmit a first scheduling request (SR) to the first cell location and, if Radio Link Monitoring (RLM) indicates that a signal from the first cell location is weak or if a radio link failure (RLF) condition is triggered, causing the UE to transmit the BSR and SR to the second cell location.

For example, in some embodiments, if UE is configured to send BSR/SR for a split bearer primarily to SeNB cell, if RLM indicates that the cell is weak (or there is some kind of a RLF condition triggered), UE may send BSR/SR instead to the MeNB. Furthermore, in some embodiments, if UE sends BSR for a split bearer to both MeNB and SeNB, there could be a bit indicating that it was transmitted to both, or that it was transmitted to the other cell as well, in case network does not configure UE this.

In an example embodiment, if there is one configuration indicating where UE may send the BSR, in case network wants uplink (UL) data to SeNB, but RLC status PDUs (for MeNB downlink) to MeNB, then if there is no data, UE may trigger M-BSR for RLC status PDU only. This may depend on the $X_n$ delay (interface delay): if for example $X_n$ delay is large (e.g., 50 ms), then UE may send the BSR, respectively SR directly.

As such, as shown in block 515 of FIG. 5, the apparatus may include means, such as the processor 22 or the like, for, in an instance in which the indication provides that the UE is to transmit the BSR to the first cell location and the second cell location, causing the BSR to include a bit indicating the BSR is being transmitted to both the first cell location and the second cell location.

As shown in block 520 of FIG. 5, the apparatus may include means, such as the processor 22 or the like, for in an instance in which no uplink (UL) bearer split is configured, a Physical uplink shared channel (PUSCH) is being utilized to only to one cell location, and RLC status forwarded over Xn to a second cell location, and wherein transmitting BSR to the first cell location fails, causing BSR to be transmitted to the second cell location.

As shown in block 525 of FIG. 5, the apparatus may include means, such as the processor 22 or the like, for in an instance in which no uplink (UL) bearer split is configured, a Physical uplink shared channel (PUSCH) is being utilized to only to one cell location, and RLC status forwarded over $X_n$ to a second cell location, and wherein transmitting BSR to the first cell location fails, causing BSR to be transmitted to the second cell location; and causing an attempt at random access to the first cell location.

As shown in block 530 of FIG. 5, the apparatus may include means, such as the processor 22 or the like, for including with the BSR transmitted to the second cell location, signaling indicating that the first cell location failed to provide a response.

As shown in block 535 of FIG. 5, the apparatus may include means, such as the processor 22 or the like, for in an instance in which UL transmission to the first cell location, and RLC status PDUs related to DL data are being sent to the second cell location, causing transmission of the BSR, the BSR only indicating an amount of data relevant to the receiving cell.

In some embodiments, such as where there is one configuration indicating where UE shall send the BSR, a method may be provided in which, if NW wants UL data to a second cell location (e.g., SeNB), but RLC status PDUs (e.g., for MeNB DL) to the first cell location (e.g., MeNB), in an case where no data is present to be transmitted, UE is triggering M-BSR for RLC status PDU only. In some embodiments, triggering may depend on $X_n$ delay. For example, if large (e.g., 50 ms) delay, then UE may send it directly as a result of the delay.

The indication where UE shall send the BSR may be provided by RRC configuration with RRC signaling or it may be provided as MAC level signaling, e.g., as a MAC control element (CE) or even as physical layer signaling, e.g., on PDCCH. The indication may be per bearer or bearer group or per bearer type (e.g., split bearer and non-split bearer).

As described above, FIGS. 4 and 5 illustrate flowcharts of, for example method provided herein according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 415, 420, and 435 in FIG. 4. Modifications, additions, or amplifications to the operations above may be performed in any order and in any combination.

The UE or eNB or the like, may include or otherwise be associated with an apparatus 20 as shown in FIG. 6. The apparatus, such as that shown in FIG. 6, is specifically configured in accordance with an example embodiment of the present invention to provide for dynamic adaptive band selection in heterogeneous networks based on line of sight and non-line of sight traffic. The apparatus may include or otherwise be in communication with a processor 22, a memory device 24, a communication interface 26 and an optional user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a wireless communication server 15. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more user equipment 10 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also optionally include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the That which is claimed:

1. A method, comprising:
receiving, at a user equipment, an indication providing a cell location to which the user equipment, operating in a dual connectivity mode, should transmit a buffer status report for each of at least one bearer, the cell location being one of a first cell location, a second cell location, a first cell location and second cell location, or a first cell location or second cell location; and
in response to being triggered, causing the buffer status report to be transmitted to the cell location provided in the indication,
wherein the method further comprises, in an instance in which the indication provides that the user equipment is to transmit the buffer status report to the first cell location:
causing the user equipment to transmit a scheduling request to the first cell location; and
if radio link monitoring indicates that a signal from the first cell location is weak or if a radio link failure condition is triggered, causing the user equipment to instead transmit the buffer status report and the scheduling request to the second cell location.

2. The method according to claim 1, wherein the bearer is a split bearer.

3. A method according to claim 1, further comprising, in an instance in which the indication provides that the user equipment is to transmit the buffer status report to the first cell location and the second cell location in an alternating manner:
causing the user equipment to transmit a first scheduling request to the first cell location;
causing the user equipment to wait a predetermined time after transmitting the scheduling request; and
causing the user equipment to transmit a second scheduling request to the second cell location if an uplink grant is not received in response to the first scheduling request.

4. A method according to claim 1, wherein the indication is provided by radio resource control signaling, media access control signaling, or physical layer signaling.

5. A method according to claim 1, further comprising, in an instance in which the indication provides that the user equipment is to transmit the buffer status report to the first cell location and the second cell location in an alternating manner
causing the user equipment to transmit a first scheduling request to the first cell location;
if an uplink grant is not received in response to the first scheduling request, causing the user equipment to re-transmit a first scheduling request to the first cell location; and
causing the user equipment to transmit a second scheduling request to the second cell location if after a predetermined number of re-transmission or predetermined time, an uplink grant is not received in response to the first scheduling request.

6. A method according to claim 1, further comprising, in an instance in which the indication provides that the user equipment is to transmit the buffer status report to the first cell location and the second cell location in an alternating manner;
causing the user equipment to transmit a first scheduling request to the first cell location; and
if an uplink grant is not received in response to the first scheduling request, causing the user equipment to transmit a second scheduling request to the second cell location.

7. A method according to claim 1, further comprising, in an instance in which the indication provides that the user equipment is to transmit the buffer status report to the first cell location and the second cell location:
causing the buffer status report to include a bit indicating the buffer status report is being transmitted to both the first cell location and the second cell location.

8. A method according to claim 1,
wherein when transmitting buffer status report to the first cell location fails,
the buffer status report is caused to be transmitted to the second cell location.

9. A method according to claim 1, further comprising:
including signaling indicating that the first cell location failed to provide a response, said signaling being included with the buffer status report transmitted to the second cell location.

10. A method according to claim 1, further comprising, in an instance in which uplink transmission to the first cell location, and radio link control status protocol data units related to downlink data are being sent to the second cell location:
causing transmission of the buffer status report, the buffer status report only indicating an amount of data relevant to the receiving cell.

11. An apparatus, comprising:
at least one processor, and
at least one memory including computer program code,
the at least one memory and computer program code configured to, with the processor, cause the apparatus to
receive an indication providing a cell location to which the apparatus, operating in a dual connectivity mode, should transmit a buffer status report for each of at least one bearer, the cell location being one of a first cell location, a second cell location, a first cell location and second cell location, or a first cell location or second cell location; and
in response to being triggered, causing the buffer status report to be transmitted to the cell location provided in the indication,
in an instance in which the indication provides that the apparatus is to transmit the buffer status report to the first cell location, the at least one memory and computer program code are further configured, with the processor, to cause the apparatus to transmit a scheduling request to the first cell location, and if radio link monitoring indicates that a signal from the first cell location is weak or if a radio link failure condition is triggered, cause the apparatus to instead transmit the buffer status report and the scheduling request to the second cell location.

12. An apparatus according to claim 11, wherein the bearer is a split bearer.

13. An apparatus according to claim 11, wherein the at least one memory and computer program code are further configured to, with the processor, cause the apparatus to, in an instance in which the indication provides that the user equipment is to transmit the buffer status report to the first cell location and the second cell location in an alternating manner:
cause the user equipment to transmit a first scheduling request to the first cell location;
cause the user equipment to wait a predetermined time after transmitting the scheduling request; and
cause the user equipment to transmit a second scheduling request to the second cell location if an uplink grant is not received in response to the first scheduling request.

14. An apparatus according to claim 11, wherein the indication is provided by radio resource control signaling, media access control signaling, or physical layer signaling.

15. An apparatus according to claim 11, wherein the at least one memory and computer program code are further configured to, with the processor, cause the apparatus to, in an instance in which the indication provides that the user equipment is to transmit the buffer status report to the first cell location and the second cell location in an alternating manner:
cause the user equipment to transmit a first scheduling request to the first cell location;
if an uplink grant is not received in response to the first scheduling request, cause the user equipment to re-transmit a first scheduling request to the first cell location; and
cause the user equipment to transmit a second scheduling request to the second cell location if after a predetermined number of re-transmission, an uplink grant is not received in response to the first scheduling request.

16. An apparatus according to claim 11, wherein the at least one memory and computer program code are further configured to, with the processor, cause the apparatus to, in an instance in which the indication provides that the user equipment is to transmit the buffer status report to the first cell location and the second cell location in an alternating manner:
cause the user equipment to transmit a first scheduling request to the first cell location; and
if an uplink grant is not received in response to the first scheduling request, cause the user equipment to transmit a second scheduling request to the second cell location if after a predetermined number of re-transmissions.

17. An apparatus according to claim 11, wherein the at least one memory and computer program code are further configured to, with the processor, cause the apparatus to:
in an instance in which the indication provides that the user equipment is to transmit the buffer status report to the first cell location and the second cell location in an alternating manner,
cause the user equipment to transmit a first scheduling request to the first cell location; and
if an uplink grant is not received in response to the first scheduling request, cause the user equipment to transmit a second scheduling request to the second cell location if after a predetermined number of re-transmission, an uplink grant is not received in response to the first scheduling request.

18. A computer program embodied on a non-transitory computer readable medium having program code portions stored thereon, the program code portions configured, upon execution by a processor to:
receive an indication providing a cell location to which a user equipment, operating in a dual connectivity mode, should transmit a buffer status report for each of at least one, the cell location being one of a first cell location, a second cell location, a first cell location and second cell location, or a first cell location or second cell location; and
in response to being triggered, cause the buffer status report to be transmitted to the location provided in the indication,
in an instance in which the indication provides that the user equipment is to transmit the buffer status report to the first cell location, cause the user equipment to transmit a scheduling request to the first cell location, and if radio link monitoring indicates that a signal from the first cell location is weak or if a radio link failure condition is triggered, cause the user equipment to instead transmit the buffer status report and the scheduling request to the second cell location.

19. A computer program product according to claim 18, wherein the bearer is a split bearer.

* * * * *